(12) United States Patent
Windt et al.

(10) Patent No.: US 12,182,750 B2
(45) Date of Patent: Dec. 31, 2024

(54) METHOD AND COMPUTER PROGRAMME FOR DISCOVERING POSSIBLE ERRORS IN A PRODUCTION PROCESS

(71) Applicant: SMS group GmbH, Düsseldorf (DE)

(72) Inventors: Katja Windt, Bremen (DE); Marc Hütt, Bremen (DE)

(73) Assignee: SMS group GmbH, Düsseldorf (DE)

( * ) Notice: Subject to any disclaimer, the term of this patent is extended or adjusted under 35 U.S.C. 154(b) by 504 days.

(21) Appl. No.: 17/606,886

(22) PCT Filed: Apr. 24, 2020

(86) PCT No.: PCT/EP2020/061520
§ 371 (c)(1),
(2) Date: Jan. 4, 2022

(87) PCT Pub. No.: WO2020/221670
PCT Pub. Date: Nov. 5, 2020

(65) Prior Publication Data
US 2022/0215318 A1    Jul. 7, 2022

(30) Foreign Application Priority Data

Apr. 29, 2019 (DE) ...................... 10 2019 206 139.7
Jun. 14, 2019 (DE) ...................... 10 2019 208 708.6

(51) Int. Cl.
*G06Q 10/0639* (2023.01)
*G05B 19/418* (2006.01)
*G06Q 10/0633* (2023.01)

(52) U.S. Cl.
CPC . *G06Q 10/06393* (2013.01); *G05B 19/41875* (2013.01); *G06Q 10/0633* (2013.01); *G05B 2219/32368* (2013.01)

(58) Field of Classification Search
CPC ..................... G06Q 10/06393; G06Q 10/0633
See application file for complete search history.

(56) References Cited

U.S. PATENT DOCUMENTS

| | | | |
|---|---|---|---|
| 2015/0205855 A1* | 7/2015 | Takahashi | G06F 16/285 707/737 |
| 2017/0109646 A1* | 4/2017 | David | G03F 7/70625 |
| 2017/0330157 A1 | 11/2017 | Lamers et al. | |
| 2020/0104775 A1* | 4/2020 | Chintalapati | G06Q 10/06393 |
| 2020/0132882 A1* | 4/2020 | Runkana | G06N 20/00 |

OTHER PUBLICATIONS

Karpov et al., "Interlaboratory comparisons between results from testing metallurgical products for precious metal content", Accred Qual Assur (2004) 9:404-410. (Year: 2004).*
International Search Report issued on May 28, 2020 in corresponding International application No. PCT/EP2020/061520; 7 pages.
International Preliminary Report on Patentability dated May 26, 2021 of corresponding International Application No. PCT/EP2020/061520; 40 pgs.
Written Opinion by IPER dated Feb. 4, 2021 of corresponding International Application No. PCT/EP2020/061520; 17 pgs.
"A high-bias, low-variance introduction to Machine Learning for physicists", Pankaj Mehta et al., Mar. 23, 2019, physics.comp-ph, Department of Physics, Boston University, 119 pgs.
"Deep learning applications and challenges in big data analytics", Maryam M Najafabadi et al., Journal of Big Data (2015) 2:1.
"Exploring due reliability in production systems using data mining methods adapted frome gene expression analysis", Katja Windt et al., CIRP Annals—Manufacturing Technology, 60, 2011, 473-476, 7 pgs.
"Gene set enrichment analysis: A knowledge-based approach for interpreting genome-wide expression profiles", Aravind Subramanian et al., PNAS, Oct. 25, 2005, vol. 102, No. 43, 15545-15550, 6 pgs.
"Machine Learning in Genomic Medicine: A Review of Computational Problems and Data Sets", Michael K. K. Leung et al., Proceedings of the IEEE vol. 104, No. 1, Jan. 2016, 22 pgs.
"Patterns of Subnet Usage Reveal Distinct Scales of Regulation in the Transcriptional Regulatory Network of *Escherichia coli*", Carsten Marr et al., PLos Computational Biology, vol. 6, Jul. 2010, 9 pgs.
"Statistical mechanics of complex networks", Reka Albert et. al., Reviews of Modern Physics, vol. 74, Jan. 2002, 51 pgs.
"The Gene Ontology (GO) database and informatics resource", Nucleic Acids Research, 2004, vol. 32, Database Issue, 4 pgs.
"Stahlindustrie und Anlagenbau—von der Digitalisierung zum digitalen Eco-System", Katja Windt, stahl und eisen 138 (2018) Nr. 11, English abstract included, 6 pgs.

* cited by examiner

*Primary Examiner* — Ricky Go
(74) *Attorney, Agent, or Firm* — Maier & Maier, PLLC

(57) ABSTRACT

A method and a computer program for discovering possible errors in a production process for manufacturing metal products. The method involves removing at least one process parameter value from the cluster or adding at least one process parameter to the cluster. Second Z-score values, which are compared with the first Z-score values, are then determined for the thus-altered cluster. The changes in the Z-score values provide suggestions for troubleshooting and process optimization which are direct and can be implemented immediately.

14 Claims, No Drawings

METHOD AND COMPUTER PROGRAMME FOR DISCOVERING POSSIBLE ERRORS IN A PRODUCTION PROCESS

FIELD

The invention relates to a computer-supported method for discovering at least one possible error in a production process for producing a metal product in a metallurgical system. Moreover, the invention relates to a corresponding computer program.

BACKGROUND

Such methods and computer programs are basically known in the prior art, for example, from the technical article "Exploring due date reliability in production systems using data mining methods adapted from gene expression analysis," by Prof. Dr. K. Windt and Prof. Dr. Marc-Thorsten Hutt, published in the CIRP Annals—Manufacturing Technology 60 (2011), pages 473-476,. This article describes various methods, such as data mining and enrichment analysis, for discovering errors, particularly with methods for producing steel strip. The known enrichment analysis first requires the formation of clusters of process parameter values in a parameter space of the process to be examined. The clusters are then respectively evaluated with respect to their influence on an assigned performance indicator for the production process, which in this case is a delay or lateness for example. This influence is measured in the form of an enrichment factor, also known as a Z-score value. With the aid of enrichment analysis, the clusters that have an especially high or especially low influence on the performance indicator, which is the delay or lateness for example, in the parameter space of the production process can be identified in this manner. In a subsequent step, those individual process parameters which have an especially high influence can then be extracted from the cluster.

These results of the enrichment analysis only enable limited discovery of causes, no understanding of assigned underlying mechanisms, and no derivation of patterns for the production process to be analyzed for the improvement thereof with respect to a predetermined performance indicator.

SUMMARY

The object upon which the invention is based is the calculation and evaluation of determined Z-score values for discovering at least one possible error in a production process for creating a metal product such that said Z-score values enable a further reduction of production time and/or a further reduction in costs for machinery use in the production process for creating metal products by discovering the causes of errors.

This is characterized by the following steps:

generating a modified cluster by removing from the cluster or adding to the cluster at least one process parameter value, repeated applying of the performance enrichment analysis to the modified cluster and the assigned performance indicator to determine a second Z-score value between the modified cluster and the assigned performance indicator, and determining a change between the first Z-score value and the second Z-score value as a measure of the influence of the parameter value removed from the cluster on the dependency between the performance indicator and the cluster and thus as an indicator of a possible error and the cause thereof.

The object is likewise achieved by means of another method. This method differs from the previous method only by virtue of the fact that the performance indicator is replaced by an external process parameter value, which likewise originates from the parameter space of the production process but not from the claimed cluster.

The Z-score values determined by the performance enrichment analysis or the determined Z-score value differences directly indicate the mechanistic causes of systematic errors and deviations with respect to performance indicators in the production process to be examined and thus enable the identification of new strategies in the troubleshooting and optimization of this process.

The performance enrichment analysis (PEA) combines cluster analyses and optional dimension reduction with known enrichment analyses and network analyses. Clusters in the parameter space are interlinked, via the enrichment of performance indicators in the clusters, with the level of the process performance. The enrichment of a performance indicator for a cluster in this case is determined via the statistical Z-score value as compared to a zero-inflated model of randomized performance indicators. Any known standard method can be used for the cluster analysis. According to the invention, the PEA is not only applied to an original cluster of process parameter values in a parameter space of the production process but also to a modified cluster. The modification of the original cluster is that at least one process parameter value from the parameter space is either removed from the cluster or added to the cluster. A change in the Z-score values can then be determined by means of the claimed additional applying of the PEA to the modified cluster. This change in the Z-score values is a measure of how strong a "signal," i.e. the coupling, is between clusters and performance indicators or between clusters and external process parameter values and thus the predictability of the performance indicator or external process parameter value of an order (from its cluster affiliation). The change in Z-score values when omitting or adding the parameter value indicates how strongly the parameter is contributing to the signal.

An external parameter value, which belongs to the parameter space of the production process but not to the cluster, takes on the role of the performance indicator here. In this case, the prediction probability of a parameter value from the clusters to the remaining parameters is measured.

Definition of Terms

In addition to errors in the classical sense, the term "error" as relates to the present description also refers to systemic incompatibilities, deficiencies, also insufficient system capacities for example, in the production process to be examined.

The term "metal product" as relates to the present description refers particularly to metal strips of all possible thicknesses, for example between 0.5 mm and 800 mm, pre-strip, hot strip, or cold strip, the latter being untreated or treated in a strip treatment system, e.g. coated with zinc, but also a metal melt, etc. The term metal means particularly steel.

The term "metallurgical system" as relates to the present invention can mean any type of system which is suitable for creating the metal product to be produced. For example, the metallurgical system may be a casting system for creating a cast strand from a metal melt, a pre-roll train for rolling the cast strand into a pre-strip, a finishing roll train for rolling the cast strand or the pre-strip into a hot strip, a cold-rolling system or a strip treatment system for treating, particularly finishing or coating, a metal strip that was cold-rolled beforehand, etc.

The term "production process" includes the term "manufacturing process."

DETAILED DESCRIPTION

In the scope of the present invention, a performance indicator is a key indicator for describing the effectiveness and/or the efficiency of a production process in a metallurgical system. Examples: delay or lateness in reaching the production target, production quantity, unit of time, etc.

The grouping of individual process parameter values into a cluster within a parameter space can be done with any of the known standard methods for cluster formation.

Performance enrichment analysis: A variant of machine learning with interpretable internal representations for discovering the mechanisms behind systematic changes of performance indicators in industrial production and manufacturing processes.

Z-score: This is a statistical measure of the significance of a measured variable. A zero-inflated model is used to generate data comparable to real data. The same measured variable as in real data is determined using this zero-inflated model data. This process is repeated multiple times so that a mean value and a standard deviation can be determined for the measured variable obtained from the zero-inflated model data. The Z-score is the difference between the measured variable for the real data and the mean value from the zero-inflated model data, divided by the standard deviation. A Z-score of +3 indicates, for example, that the measured variable is three standard deviations higher than the mean value of the zero-inflated model data.

Zero-inflated model: In statistics, this is the representation of random data which can be used as a contrast to the real data (thus to determine the distinction). The zero-inflated model used in the PEA is a randomly mixed (i.e. randomized) distribution of the performance indicators over orders. The clusters of orders in the parameter space are retained.

The connection between clusters and performance indicators is destroyed by the randomization. A deviation between the real and the randomized data (measured by the Z-score) thus indicates a systematic connection between clusters and performance indicators.

Cluster: A cluster is a group of points or parameter values in a space, the parameter space in this case, wherein the points in the group have more similarity among each other than the average of points outside the group. In the methodologies of data analysis, there are various methods available for operationalization of this formal definition and determination of such clusters. The PEA makes use of such standard methods, since the PEA commences with identified clusters and determines the enrichment (i.e. the Z-score) of the performance indicators as relates to this cluster.

Table 1 as follows shows examples of parameters, the measured or default values of which can be grouped into clusters:

| Category | Attributes | Parameters |
| --- | --- | --- |
| Order | Type of product | Steel grade, production capacity |
| | Measurement | Width, thickness |

-continued

| Category | Attributes | Parameters |
| --- | --- | --- |
| | Steel casting sequences | Suitable number of steel casting sequences |
| | Weight | Coil weight, coating weight |
| Production process | Production depth | Number of production steps |
| | Change of production sites | Number of changes of production site |
| | Rework intensity | Number of rework steps |
| | Quality | Surface quality, steel quality |
| | Changes in assignments | Number of changes in assignments of order and product |

According to a first exemplary embodiment, it is advantageous to define a threshold value for the change between the first and the second Z-score value. This applies to the method in which the Z-score value defines the dependency of the performance indicator from the cluster and applies to the alternatively claimed method in which the Z-score value defines the dependency of an external process parameter value as a function of the cluster. The threshold value for the change of the Z-score value is preferably set such that, when the change of the Z-score value exceeds the threshold value, the influence of the cluster on the performance indicator or on the external process parameter value is considered to be relevant.

According to a further exemplary embodiment, the dimension of the parameter space is advantageously reduced respectively before the applying of the PEA. There are various methods known in the prior art for doing this. Thus, it is known to eliminate highly correlated process parameters or to transform vectors of the process parameters within the scope of a principal component analysis (PCA) to main components.

Preferably, the plurality of dependencies discovered with the aid of the PEA is transitioned into a network, the nodes of which are process parameter values and performance indicators and the connections of which represent a significant enrichment, i.e. Z-score value, preferably above the defined threshold value. This results in a visualization of the results of a performed PEA in the form of a dependency network diagram. The combining of a first network diagram, which results from applying the PEA to the original cluster, and a second network diagram, which results from applying the PEA to the changed cluster, leads to an overall network of enrichment-based relationships between process parameter values in the cluster and performance indicators or at least one external process parameter. The connections between the nodes in this overall network indicate directly and promptly implementable suggestions for troubleshooting and process optimization.

In other words, the following is claimed according to the present invention:

A function f1 evaluates a given list of orders according to the previously described method. For each identified cluster in the parameter space and for each category of the performance indicator, a Z-score value is determined which measures the predictability of the performance indicator as relates to this cluster. The result of this function is then a list of clusters with their corresponding Z-score values. The result of the first function f1 is then supplied as an input variable of a second function. In addition, a further (future) order is supplied to this second function as an input variable. First, the cluster which can be assigned to this further order is determined. Then, based on the Z-score value of this cluster, there is a determination as to whether a prediction of the performance indicator is possible for this new order. If this is the case, the prediction is output. Otherwise, it is output that there is no prediction possible for this order.

The invention claimed is:

1. A method comprising:
defining a plurality of process parameters representing a production process in a parameter space of the production process;
detecting or specifying values for the plurality of process parameters;
grouping a part of the plurality of parameter values into a cluster in the parameter space;
applying a performance enrichment analysis to the cluster and to a performance indicator assigned to the cluster in order to determine a first dependency between the cluster and the performance indicator, wherein the dependency is evaluated with a first Z-score value;
generating a modified cluster by removing from the cluster or adding to the cluster a process parameter value;
applying the performance enrichment analysis to the modified cluster and the assigned performance indicator to determine a second Z-score value between the modified cluster and the assigned performance indicator; and
determining a change between the first Z-score value and the second Z-score value as a measure of the influence of the process parameter value removed from the cluster or added to the cluster; and
indicating a possibility of an error in the production process when the change exceeds a defined threshold value, wherein the performance indicator of the production process involves the following attributes:
quality devaluations of a created metal product or scrap quantities;
on-time schedule variances; or
output quantities.

2. The method according to claim 1, wherein the influence of the removed or added parameter value on the dependency between the performance indicator and the cluster is considered to be significant when the change exceeds the defined threshold value.

3. The method according to claim 1, further comprising:
eliminating highly correlated process parameters or transforming vectors of the process parameters to main components within a principal component analysis (PCA) before applying the performance enrichment analysis.

4. The method according to claim 1, further comprising:
visualizing the result of the first performance enrichment analysis in the form of a first dependency network, wherein either process parameters from the parameter space or the clusters formed from the process parameter values or, the performance indicators or the external process parameter values respectively form nodes of the first dependency network, and connections between the nodes of the first dependency network, evaluated with the Z-score value, represent the influence of the removed or added process parameter value on the performance indicator or the external process parameter value.

5. The method according to claim 4, further comprising:
illustrating results of the repeated second performance enrichment analysis in a second dependency network; and combining the first dependency network and the second dependency network into one overall network with enrichment-based relationships between the clusters and the performance indicators or the external process parameter values.

6. The method according to claim 1, wherein the process parameters from the parameter space, within and outside of the clusters comprise:
as relates to type of product: the metal quality or the product category;
as relates to dimensions of the product: width, thickness; length, format as relates to weight: weight per piece, coil weight, coating weight;
as relates to production capacity: mass flow, quantity; or
as relates to mode of operation of a metallurgical system: pass schedule, speed.

7. A non-transitory computer readable medium containing computer instructions stored therein for causing a computer processor to perform the method of claim 1.

8. A method comprising:
defining a plurality of process parameters representing a production process in a parameter space of the production process;
detecting or specifying values for the plurality of process parameters;
grouping a part of the plurality of process parameter values into a cluster in the parameter space;
applying a performance enrichment analysis to the cluster and to an external process parameter value of the parameter space not assigned to the cluster in order to determine a first dependency between the cluster and the external process parameter value, wherein the dependency is evaluated with a first Z-score value;
generating a modified cluster by removing from the cluster or adding to the cluster at least a process parameter value;
applying of the performance enrichment analysis to the modified cluster and the external process parameter value to determine a second Z-score value between the modified cluster and the external process parameter value; and
determining the change between the first Z-score value and the second Z-score value as a measure of the influence of the process parameter value removed from the cluster or added to the cluster; and
indicating a possibility of an error in the production process when the change exceeds a defined threshold value, wherein the performance indicator of the production process involves the following attributes:
quality devaluations of a created metal product or scrap quantities;
on-time schedule variances; or
output quantities.

9. The method according to claim 8, wherein the influence of the removed or added parameter value from the parameter space on the dependency between the cluster and the external process parameter value is considered to be significant when the change exceeds the defined threshold value.

10. The method according to claim 8, further comprising:
eliminating highly correlated process parameters or by-transforming vectors of the process parameters to main components within a principal component analysis (PCA) before applying the performance enrichment analysis.

11. The method according to claim 8, further comprising:
visualizing the result of the first performance enrichment analysis in the form of a first dependency network, wherein either the process parameters from the parameter space or the clusters formed from the process parameter values, or the performance indicators or the external process parameter values, respectively form nodes of the first dependency network, and connections between the nodes of the first dependency network, evaluated with the Z-score value, represent the influence of the removed or added process parameter value on the performance indicator or the external process parameter value.

12. The method according to claim 11, further comprising:

illustrating results of the repeated second performance enrichment analysis in a second dependency network; and combining the first dependency network and the second dependency network into one overall network with enrichment-based relationships between the clusters and the performance indicators or the external process parameter values.

13. The method according to claim 8, wherein the process parameters from the parameter space, within and outside of the clusters comprise:

as relates to type of product: the metal quality or the product category;

as relates to dimensions of the product: width, thickness; length, format as relates to weight: weight per piece, coil weight, coating weight;

as relates to production capacity: mass flow, quantity; or as relates to mode of operation of a metallurgical system: pass schedule, speed.

14. A non-transitory computer readable medium containing computer instructions stored therein for causing a computer processor to perform the method of claim 8.

* * * * *